United States Patent [19]
Creta

[11] Patent Number: 5,742,831
[45] Date of Patent: Apr. 21, 1998

[54] METHODS AND APPARATUS FOR MAINTAINING CACHE COHERENCY DURING COPENDENCY OF LOAD AND STORE OPERATIONS

[75] Inventor: Kenneth Creta, Mesa, Ariz.

[73] Assignee: Intel Corporation, Santa Clara, Calif.

[21] Appl. No.: 268,338

[22] Filed: Jun. 30, 1994

[51] Int. Cl.⁶ .................................................. G06F 13/16
[52] U.S. Cl. ..................... 395/732; 395/874; 395/728; 395/873; 395/859; 395/860; 711/118; 711/3
[58] Field of Search ........................... 395/375, 874, 395/445, 728, 732, 873, 730, 872, 859, 860; 711/118, 131, 151, 3

[56] References Cited

U.S. PATENT DOCUMENTS

| | | | |
|---|---|---|---|
| 4,901,233 | 2/1990 | Liptay | 395/394 |
| 5,123,095 | 6/1992 | Papadopoulos et al. | 395/394 |
| 5,185,871 | 2/1993 | Frey et al. | 395/381 |
| 5,210,749 | 5/1993 | Firoozmand | 370/463 |
| 5,247,626 | 9/1993 | Firoozmand | 395/200.42 |
| 5,278,969 | 1/1994 | Pashan et al. | 395/182.04 |
| 5,379,379 | 1/1995 | Becker et al. | 711/3 |
| 5,450,564 | 9/1995 | Hassler et al. | 711/158 |

OTHER PUBLICATIONS

Popescu, Val et al., "The Metaflow Architecture", IEEE Micro, Jun. 1991, pp. 10–13, 63–73.

*Primary Examiner*—Tod R. Swann
*Assistant Examiner*—J. Peikari
*Attorney, Agent, or Firm*—Blakely, Sokoloff, Taylor & Zafman

[57] ABSTRACT

Methods and apparatus for maintaining cache coherency for pending load operations. A processor is selectively stalling only when there exists certain relationships between the address of an incoming store instruction and the addresses of the pending load instructions. The address specified by an incoming store instruction is compared with all the addresses specified by the pending load instructions that are stored in a bus queue. The processor is stalled from issuing subsequent instructions and executing the store instruction if the comparison results in a match of the store instruction address with any of the addresses of the pending load instructions. Instruction issue and execution of the store instruction are unstalled when data from the matching load instruction address returns. Alternatively, a count of the number of load instructions pending in the bus queue for each specified address may be maintained. Upon receiving a store instruction, a stall occurs if the count for a corresponding address specified by the store instruction is non-zero. The count for an address specified by a load instruction is incremented if the load instruction misses the cache. When the requested data returns from external memory, the count for the address specified by the missed load instruction is decremented. When data from the load instruction address that matches the store instruction address returns and the count for the address specified by the stalled store instruction is zero, then instruction issue and execution of the store instruction are unstalled.

39 Claims, 6 Drawing Sheets

METHODS AND APPARATUS FOR MAINTAINING CACHE COHERENCY DURING COPENDENCY OF LOAD AND STORE OPERATIONS

BACKGROUND OF THE INVENTION

1. Field of the Invention

The present invention relates to cache memories, and more particularly to maintaining cache coherency during the copendency of load and store operations.

2. Art Background

Caches are used in various forms to reduce the effective time required by a processor to access instructions or data that are stored in main memory. The theory of a cache is that a computer system attains a higher speed by using a small portion of very fast memory as a cache along with a larger amount of slower main memory. The cache memory is usually placed operationally between a data processing unit and main memory. When the processor needs to access main memory it looks first to the cache memory to see whether the information required is available in the cache. When data and/or instructions are first required from main memory, the information is stored in the cache as part of a block of information (known as a cache line) that represents consecutive locations of main memory. During subsequent memory accesses to the same addresses, the processor interacts with the fast cache memory rather than main memory. Statistically, when information is accessed from a particular block in main memory, subsequent accesses most likely will call for information from within the same block. This locality of reference property results in a substantial decrease in average memory access time.

It is important to maintain consistency or coherency between cache and main memory. A special problem in maintaining such consistency arises when a store operation follows a load operation in an instruction sequence. The load operation retrieves data from main memory and stores it in a register, while a store operation writes information from a register into main memory. In a system incorporating a cache, the load operation will first attempt to retrieve the requested information from the cache at the specified memory address. If a cache miss results, then the data must be retrieved from main memory. In response, the retrieved information is loaded into the specified register and the information at the corresponding cache address is updated for future references.

When a load operation misses the cache, it may take many cycles for the data to be returned from main memory. One cause of this delay is arbitration for the memory bus. During this delay, an attempt might be made to perform a store operation to write to the same memory location specified by the load operation. Because the store operation can write the data directly to the cache independently of main memory, the store operation can immediately write to the cache. Thus, if the store operation is performed before the data requested by the pending load returns, then when the data is returned it will overwrite the newly stored data, resulting in an incorrect cache state. A way to prevent this situation is to stall the processor from issuing instructions whenever any store occurs while there are still pending load operations. Although widely used, this method is overprotective and inefficient for a store to any memory location other than the location for where a load is pending.

It is therefore desired to find a more efficient means for maintaining cache coherency during the copendency of load and store operations.

SUMMARY OF THE INVENTION

The present invention provides methods and apparatus for maintaining cache coherency during the copendency of load and store operations. The present invention overcomes the inefficiencies of the prior art by selectively stalling the processor only when there exists certain relationships between the address of an incoming store instruction and the addresses of the pending load instructions.

A computer system of the present invention includes a cache and a bus controller queue for storing pending cacheable load instructions. Each load instruction specifies an address. The address specified by an incoming store instruction is compared with all the addresses specified by the pending load instructions that are stored in the bus queue. The processor is stalled from issuing subsequent instructions and executing the store instruction if the comparison results in a match of the store instruction address with any of the addresses of the pending load instructions. Instruction issue and execution of the store instruction are unstalled when data from the matching load instruction address returns. A load instruction is stored in the queue if the load instruction misses the cache, and is flushed from the queue when data from the address specified by the missed load instruction returns from external memory. Thus, the removal of the stall corresponds to flushing the load instruction from the queue.

Alternatively, a count of the number of load instructions pending in the bus queue for each specified address may be maintained. Upon receiving a store instruction, instruction issue and execution of the store instruction are stalled if the count for a corresponding address specified by the store instruction is non-zero. The count for an address specified by a load instruction is incremented if the load instruction misses the cache. When data from the address specified by the missed load instruction returns from external memory, the count for the address specified by the missed load instruction is decremented. When data from the load instruction address that matches the store instruction address returns and the count for the address specified by the stalled store instruction is zero, then instruction issue and execution of the store instruction are unstalled.

The addresses used by the present invention that are specified by the load and store instructions may be of varying granularity. For example, each address may be the line address portion, the tag portion, the word portion, or the byte address portion of the full address of data stored in external memory, or any combination thereof.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides methods and apparatus for maintaining cache coherency during the copendency of load and store operations. For purposes of explanation, specific details are set forth to provide a thorough understanding of the present invention. However, it will be understood by one skilled in the art, from reading this disclosure, that the invention may be practiced without these details. Moreover, well-known elements, devices, process steps and the like are not set forth in order to avoid obscuring the invention.

Figure 1:
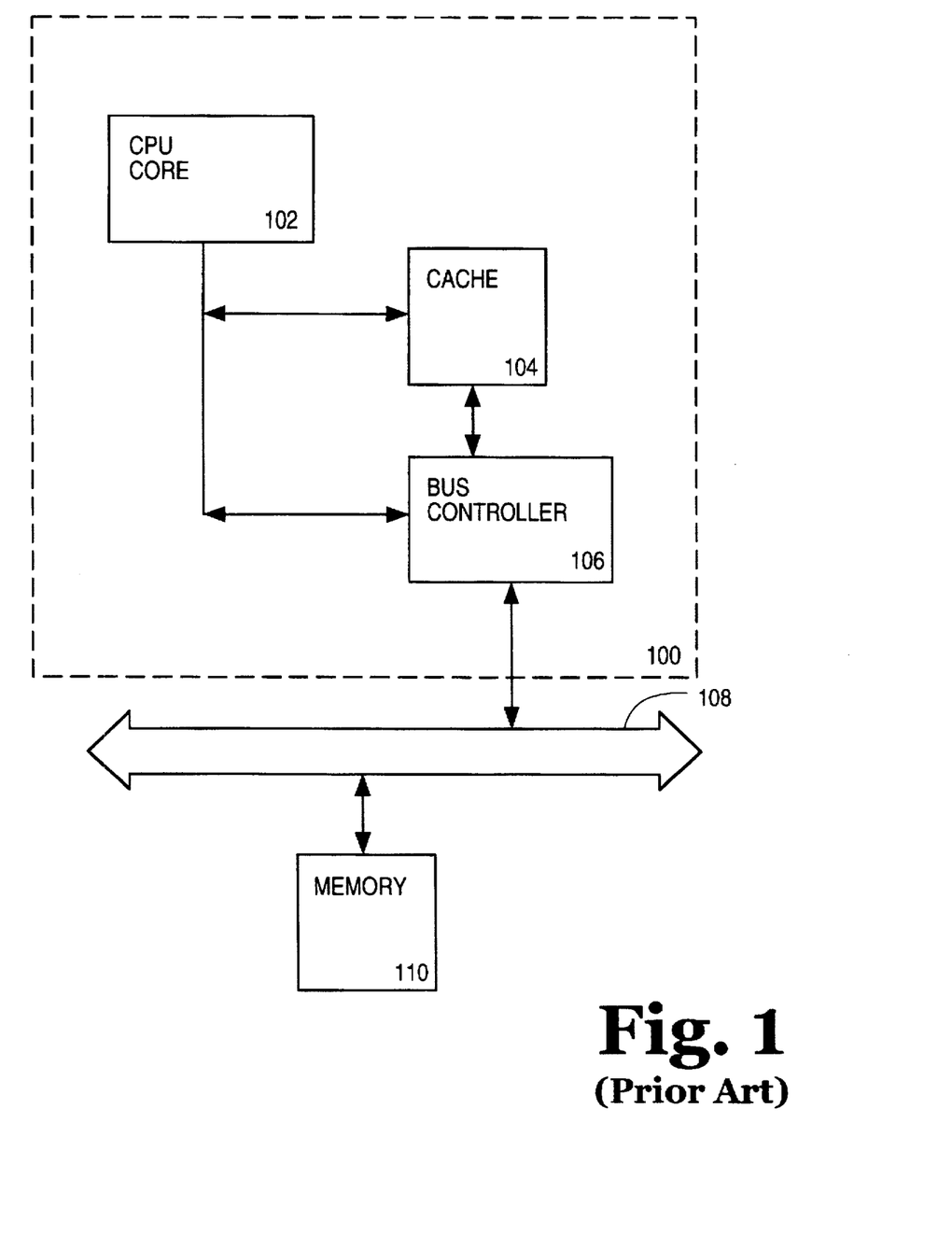
FIG. 1 is a conventional computer system incorporating a cache.

FIG. 1 illustrates a typical computer system incorporating an on-chip cache. A microprocessor chip 100 includes a CPU core 102, an on-chip cache 104 and a bus controller 106. One skilled in the art will understand that the present invention applies not only to on-chip caches such as that illustrated in FIG. 1, but also to off-chip caches as well. Over a memory bus 108, the microprocessor chip 100 communicates with a main memory device 110.

Figure 2A:
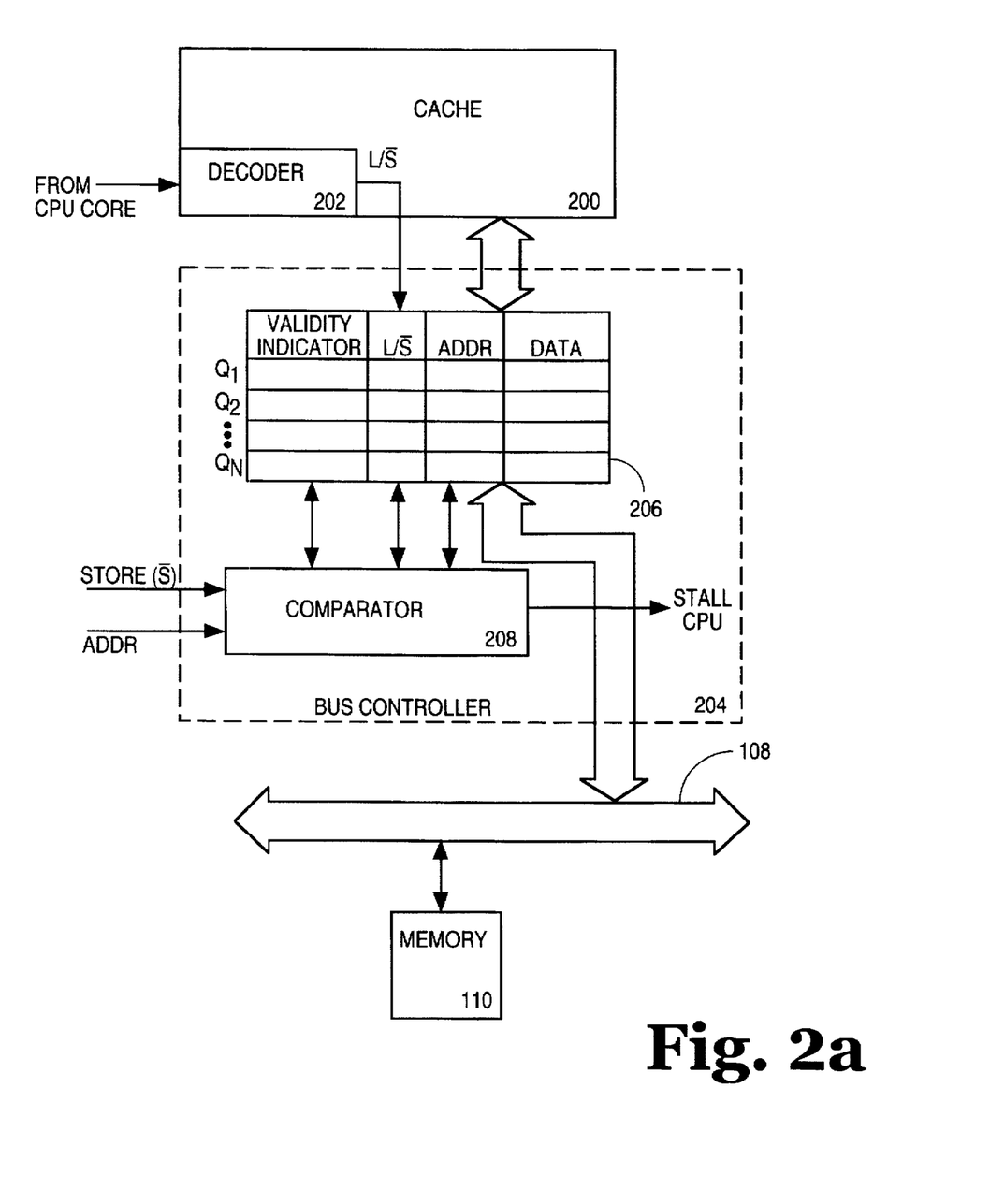
FIGS. 2A and 2B are a block diagram and a flowchart, respectively, of one embodiment of the present invention.
Figure 2B:
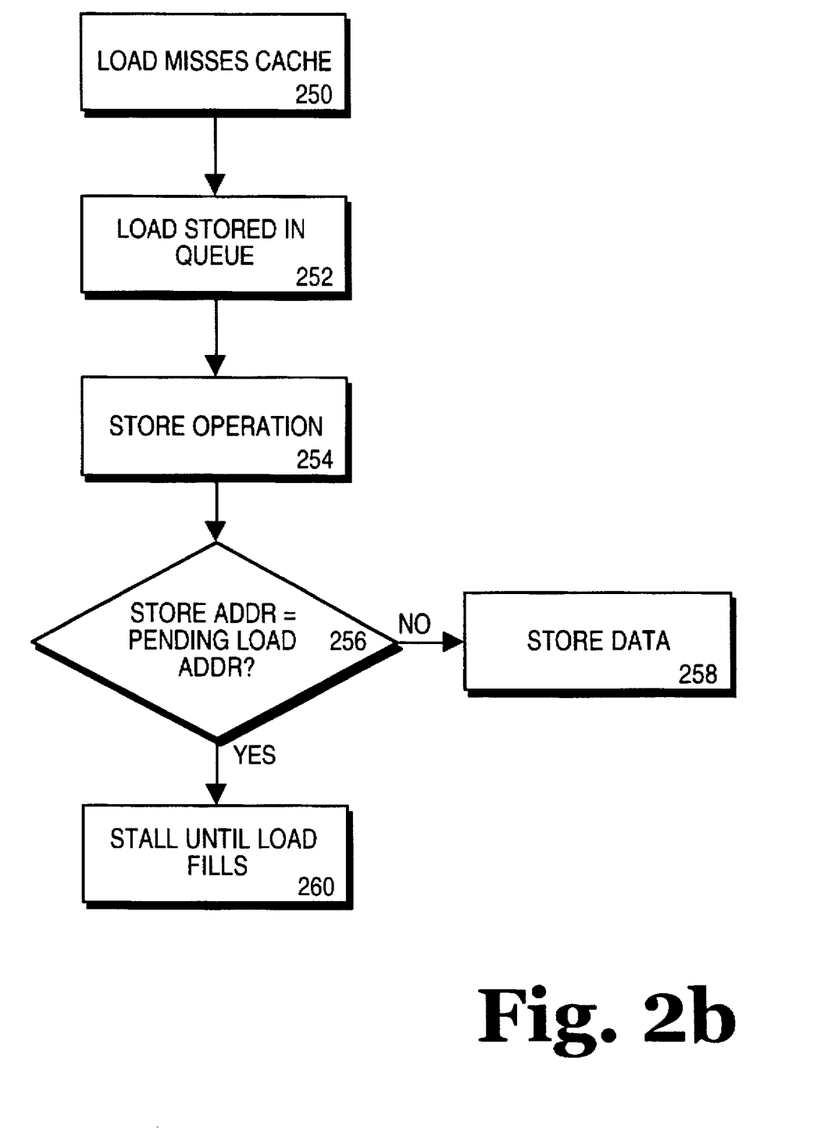

The block diagram of FIG. 2A and the flow chart of FIG. 2B illustrate the structure and operation of one embodiment of the present invention. In this embodiment, a cache 200 of the present invention includes a decoding logic circuit 202. Alternatively, the decoding logic 202 need not be incorporated into the cache 200, but may, for example, be part of an instruction decoder (not shown) in the CPU core. The decoding logic 202 examines the instruction op code received from the CPU core 102 to determine whether the instruction is a load or a store instruction. The decoding logic 202 provides an indication based upon this determination, preferably a single "load/store" bit (L/S) that is high for a load operation and low for a store operation. One skilled in the art will understand that many other representations may be used to indicate a load or a store operation.

The bus controller 204 of the present invention includes a bus queue 206 and comparator logic circuitry 208. The bus queue 206 is used as a buffer between the cache 200 and devices on the memory bus 108. The bus queue 206 maintains the addresses and data of memory accesses that are transmitted to or received from the memory bus 108. The bus queue 206 also maintains the load/store bit to indicate whether the access is a write to memory or a read from memory. As is well known in the art, the bus queue 206 may also store a valid/invalid bit or use head and tail pointers to indicate which queue entries are valid, i.e., still pending and not yet filled.

For example, in the case of a load miss (step 250), the cache 200 will send the load to the bus queue 206 (step 252). As soon as the bus controller can obtain access to the memory bus 108, the bus controller 204 issues the load from the bus queue 206 to the external memory 110. (Certain well known connections have been omitted from the figures to avoid obscuring the present invention.) When the data requested by the pending load is returned, it is stored in the data field of the queue entry corresponding to the pending load. The data will then be returned to the CPU core 102 and the cache 200 (a load fill) when the on-chip memory bus is available. At this time the corresponding queue entry will be flushed. The flushing operation may be indicated by manipulating the pointers or by resetting the valid bit of the flushed entry to indicate an invalid entry.

Because the bus queue 206 is of limited length, only a limited number of loads may be pending. If the number of load misses exceeds capacity of the queue, then the CPU core 102 must be stalled from performing any more memory access operations. After a load fill occurs and the queue is emptied of the completed load, the corresponding entry is freed to provide room in the queue for another pending load operation. One skilled in the art will understand that bus queue 206 may be implemented in a variety of fashions, including two separate queues for loads and stores, thus obviating the need for maintenance of the load/store bit in the bus queue 206.

According to the present invention, the comparator 208 receives the validity indicator (the valid/invalid bit or the pointers), the load/store bit and the address of the memory access operation. When the load/store bit indicates a store operation (step 254), the comparator 208 compares all of the addresses of the pending load operations stored in the bus queue 206 to the address of the store operation (step 256). A load operation is defined herein as "pending" only if it is valid, as indicated by the validity indicator. Of course, by the very nature of the circuit structure, the comparator 208 in this case is comparing the address of a subsequent store operation to the addresses of previous pending load operations. If the addresses do not match, then the store operation is performed (step 258). Conversely, if a comparison results in a match, this indicates that the store operation is attempting to store information at an address specified by a load operation that previously missed the cache. Consequently, in this situation the comparator 208 issues a signal to stall the CPU core 102 from performing any further operations until the requested load data is returned, at which time the stall signal will be removed when the matching pending load is flushed from the queue, as indicated by the validity indicator (step 260).

One skilled in the art will understand that the granularity of the address comparison in the comparator 208 may vary, i.e., any portion of the full address may be compared. For example, the address field of bus queue 206 may not only store the full address of the pending load operations, but rather may store only the address tag, the line address, or the word or byte address within the line. In the case of the line address comparison, for example, any pending load having a line address that matches the line address of the store address will cause a stall. The stall will be removed only when all pending loads that specify the matching line address are flushed from the queue, i.e., no pending load line addresses match the store line address field.

Figure 3A:
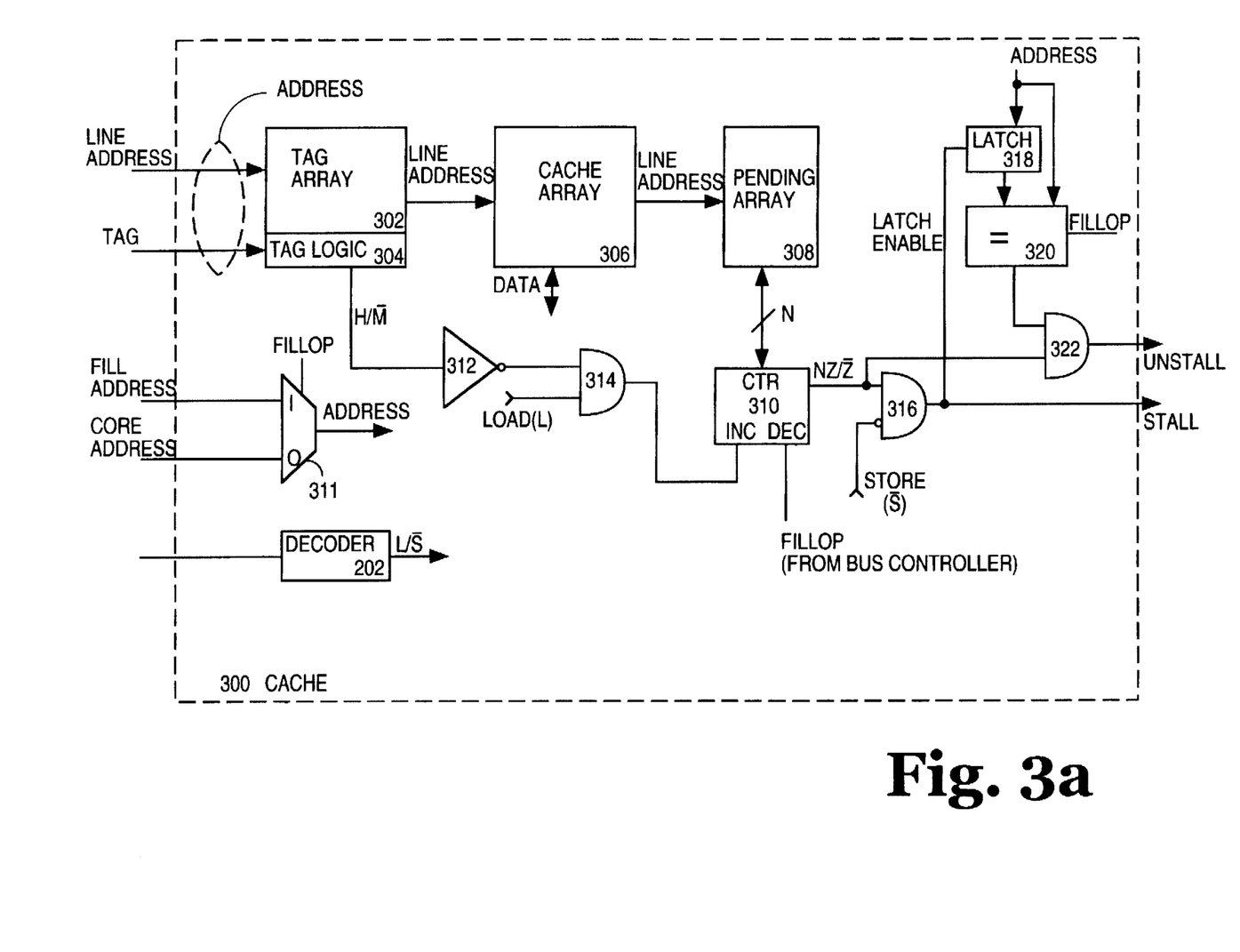
FIGS. 3A, 3B, 3C and 3D are a block diagram and flowcharts, respectively, of another embodiment of the present invention.
Figure 3B:
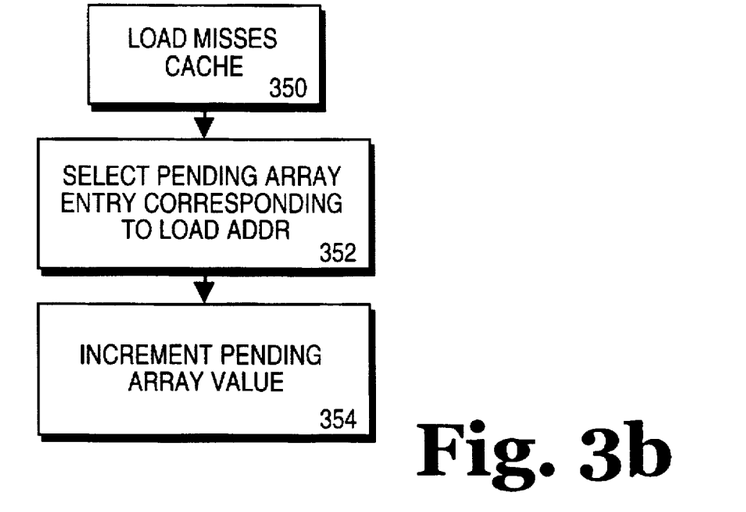
Figure 3C:
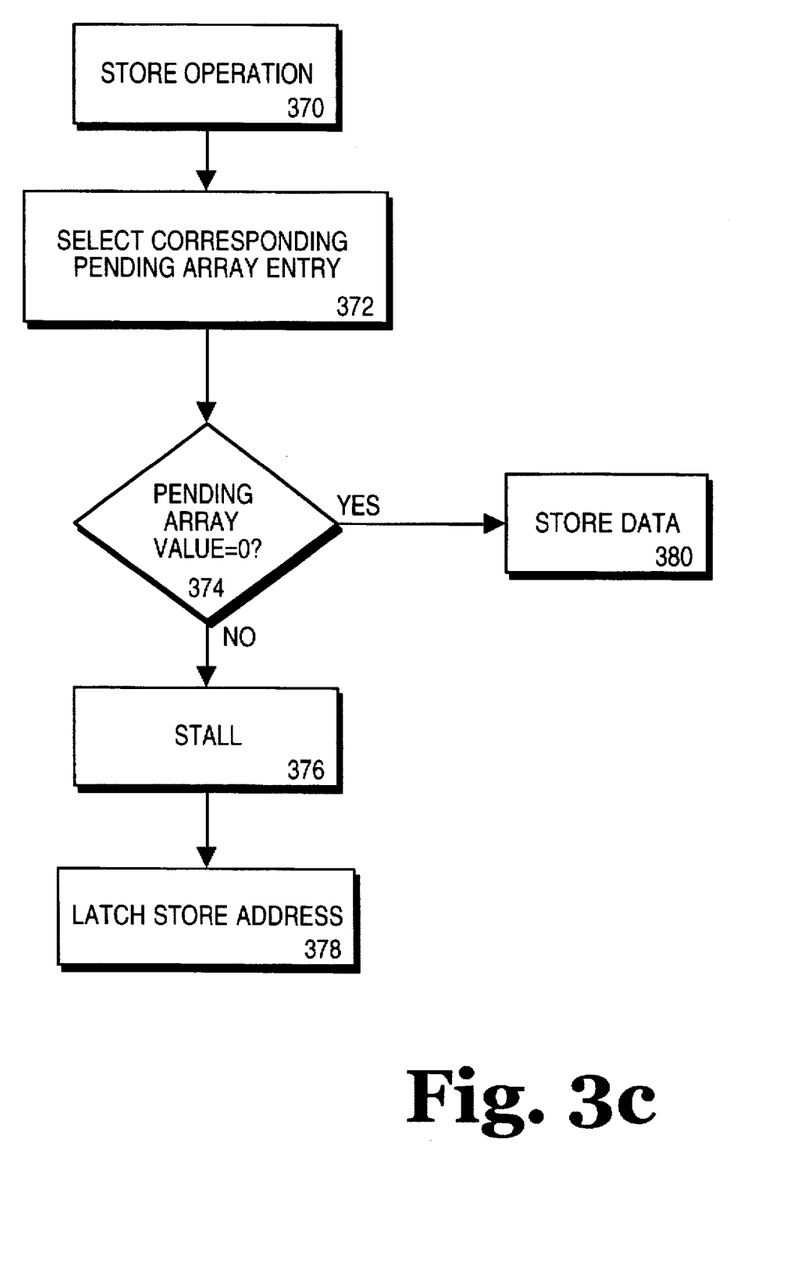
Figure 3D:
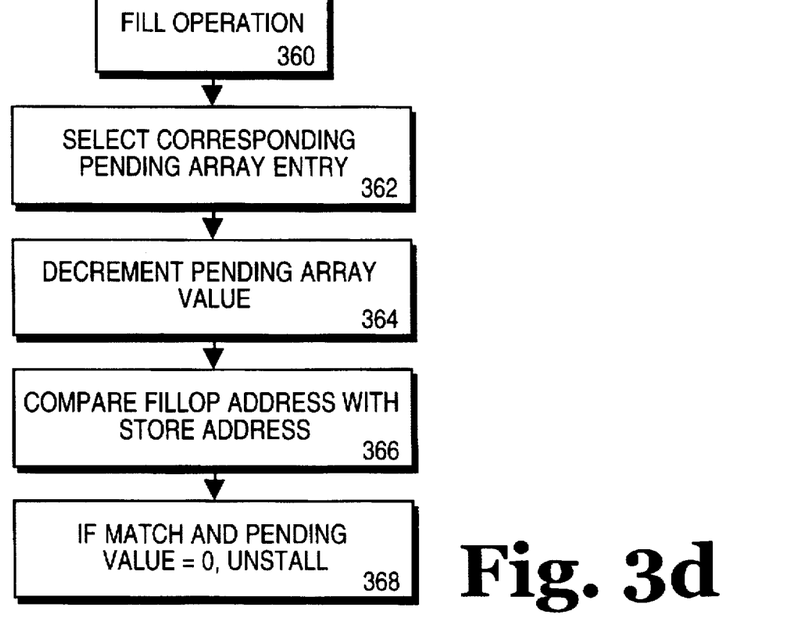

The operation of a second embodiment of the present invention will be described with reference to the apparatus of FIG. 3A and the flow charts of FIGS. 3B, 3C and 3D. The cache 300 of this embodiment includes a tag array 302 having a tag logic circuit 304, and a cache array 306 of cache lines. In addition to these conventional units, the cache 300 includes the decoder circuitry 202 that provides the load/store bit, a pending array 308, and a counter 310. The pending array 308 has a number of N-bit entries, each preferably corresponding to a cache line in the cache array 306. The number of bits (N) per entry that are maintained in the pending array 308 depends on how many load operations may be queued in the bus controller queue 206 according to the constraint that there must be N bits if 2N−1 or fewer loads may be queued.

The cache 300 may receive an address from either the CPU core (e.g., as part of a load or store instruction) or from the bus controller 204 through a multiplexer (MUX) 311. The MUX 311 may be incorporated into the cache 300 or located elsewhere on the CPU chip. When the data requested by a load instruction is returned, the bus controller 204 provides a FILLOP signal indicating the return of the data along with the address of the returning data (the "fill address"), as is well known in the art. Each address preferably includes a tag field, a line address field, a word address field and a byte address field.

In the case of a load operation, the load address is passed through the MUX 311 to the tag array 302 and the tag logic 304. The line address portion of the address selects a corresponding row of the tag array 304, and is passed on to select corresponding entries in the cache array 306 and the pending array 308, as well. The tag field of the address is presented to the tag logic 304.

In the case of a load having an address that does not match any of the tags in the tag array 302, the tag logic 304 outputs a miss signal (step 350), which is inverted by an inverter 312. In the case of a load miss, an AND gate 314 receives the miss signal from the tag logic 304 through the inverter 312, and also receives the load/store signal from the decoder 202 indicating a load operation. As a result, the AND gate 314 causes the counter 310 to increment the selected N-bit entry of the pending array 308 (it is assumed that each pending array entry starts at a zero value) (step 354). Thus, each entry of the pending array 308 keeps track of the number of pending loads in the bus queue 206 that are waiting for data to return to an address held in a cache line corresponding to the pending array entry.

When a store memory access operation is presented to the cache 300, the decoder 202 provides a load/store bit indicating the presence of a store instruction (step 370). The line address of the store instruction is presented to the pending array 306 through the MUX 311 to select the pending array entry corresponding to the cache line specified by the store (step 372). The counter 310 has an output (NZ/$\overline{Z}$) that indicates whether the pending array entry selected by the tag is not zero or zero, respectively. The store signal provided by the decoder 202 is ANDed in an AND gate 316 with the NZ/$\overline{Z}$ signal. If the ANDing operation results in a true output (the pending array value is not zero), then the present invention stalls the operations of the CPU core, preventing execution of the store and the issuance of any further instructions (steps 374, 376). The resulting stall signal is provided to an address register 318 to latch the store address (step 378). If the stall signal is not issued because the counter value has a zero value, then the store instruction is executed (step 380).

When the data specified by a load is returned, the bus controller 204 provides the FILLOP signal and the fill address to the tag array 302 and the tag logic 304 through the MUX 311. The FILLOP address tag will miss the cache, but the line address will select the pending array entry corresponding to the cache line that is to receive the returning data (step 362). Further, the FILLOF signal will cause the counter 310 to decrement the pending array entry selected by the line address (step 364). As a result, a pending array entry will hold a zero value only if no load operations for the corresponding cache line are waiting for data to return.

The FILLOP signal also enables a comparator 320, which compares the FILLOP address with the latched store address from the register 318 (step 366). The comparator 320 need only compare the FILLOP and store instruction line addresses in this embodiment. The comparator output is provided to an AND gate 322, which also receives the counter 310 output for the selected pending array value. If the store address matches the returning load address and the selected pending array value is zero, then the CPU is unstalled (step 368). Thus, instruction issue and execution of the stalled store instruction are unstalled when the count for the address specified by the stalled store instruction falls to zero.

The conventional method of stalling the processor for any store while a load is pending is inefficient. This inefficiency grows as the cache grows. By stalling the machine only for store operations that access cache lines for which loads are pending, the present invention reduces the frequency of microprocessor stalls, thus increasing instruction throughput. One skilled in the art will recognize that the present invention can easily be adapted to keep track of pending load operations on a tag, byte or word basis, instead of on a line-by-line basis. However, increasing the granularity of the invention in this manner may decrease instruction throughput in comparison to the line-by-line method.

Although the invention has been described in conjunction with a number of specific embodiments, it will be appreciated that various modifications and alterations may be made by those skilled in the art without departing from the spirit and scope of the invention. The invention should, therefore, be measured in terms of the claims which follow.

What is claimed is:

1. In a computer system including a cache and a bus controller queue for storing pending cacheable load instructions, wherein each load instruction specifies an address, a method for maintaining cache coherency for copending load and store instructions, the method comprising the steps of:

comparing an address specified by a store instruction with all the addresses specified by the pending load instructions that are stored in the bus queue; and stalling instruction issue and execution of the store instruction if the comparing step results in a match of the store instruction address with any of the addresses of the pending load instructions.

2. The method of claim 1, further comprising the step of unstalling instruction issue and execution of the store instruction when data from the matching load instruction address returns.

3. The method of claim 1, further comprising the steps of:

if a load instruction misses the cache, storing the load instruction in the queue;

if data from the address specified by the load instruction returns, flushing the load instruction from the queue.

4. The method of claim 1, wherein each address compared in the comparing step is a predetermined portion of a full address.

5. The method of claim 4, wherein each compared address is a line address.

6. The method of claim 4, wherein each compared address is an address tag.

7. In a computer system inducting a cache and a bus queue for storing pending cacheable load instructions, wherein each pending load instruction specifies an address, a method for maintaining cache coherency for copending load and store instructions, the method comprising the steps of:

maintaining a count of the number of load instructions pending in the bus queue for each specified address;

upon receiving a store instruction, stalling instruction issue and execution of the store instruction if the count for a corresponding address specified by the store instruction is not zero.

8. The method of claim 7, further comprising the steps of:

if a load instruction misses the cache, incrementing the count for the address specified by the missed load instruction; and if data from the address specified by the missed load instruction returns, decrementing the count for the address specified by the missed load instruction.

9. The method of claim 8, further comprising the step of unstalling instruction issue and execution of the store instruction when the count for the address specified by the stalled store instruction is zero.

10. The method of claim 7, further comprising the steps of:
- if a load instruction misses the cache, storing the load instruction in the queue; and
- if data from the address specified by the load instruction returns, flushing the load instruction from the queue.

11. The method of claim 7, wherein each address is a predetermined portion of a full address.

12. The method of claim 11, wherein each address is a line address.

13. The method of claim 11, wherein each address is an address tag.

14. In a computer system including a cache and a bus controller for controlling accesses to and from an external memory, an apparatus for maintaining cache coherency for pending cacheable load instructions, wherein each pending load instruction specifies an address, the apparatus comprising:
- a bus queue in the bus controller for storing pending load instructions;
- comparator logic circuitry for comparing an address specified by a store instruction with all the addresses specified by the pending load instructions in the queue, wherein the comparator issues a stall signal to stall instruction issue and execution of the store instruction if the store instruction address matches any of the addresses specified by the pending load instructions.

15. The apparatus of claim 14, wherein a load instruction is stored in the queue if the load instruction misses the cache, and a load instruction is flushed from the queue if data from the address specified by the missed load instruction returns.

16. The apparatus of claim 15, wherein instruction issue and execution of the store instruction are unstalled when the load instruction specifying the matching address is flushed from the queue.

17. The apparatus of claim 14, wherein each address is a predetermined portion of a full address.

18. The apparatus of claim 17, wherein each address is a line address.

19. The apparatus of claim 17, wherein each address is an address tag.

20. In a computer system including a cache and a bus queue for storing pending load instructions, wherein each pending load instruction specifies an address, an apparatus for maintaining cache coherency for copending load and store instructions, the apparatus comprising:
- a pending array having a plurality of array entries, each entry maintaining a count of the number of load instructions pending in the bus queue for each specified address;
- detection circuitry for stalling instruction issue and execution of a store instruction upon detecting that the count for a corresponding address specified by the store instruction is not zero.

21. The apparatus of claim 20, further comprising a counter for incrementing the count for the address specified by a load instruction that misses the cache, and for decrementing the count for the address specified by a missed load instruction if data from the address specified by the missed load instruction returns.

22. The apparatus of claim 21, wherein the detection circuitry unstalls instruction issue and execution of the store instruction upon detecting that the count for the address specified by the stalled store instruction is zero.

23. The apparatus of claim 20, wherein a load instruction is stored in the queue if the load instruction misses the cache, and a load instruction is flushed from the queue if data from the address specified by the missed load instruction returns.

24. The apparatus of claim 20, wherein each address is a predetermined portion of a full address.

25. The apparatus of claim 24, wherein each address is a line address.

26. The method of claim 24, wherein each address is an address tag.

27. A computer system for maintaining cache coherency for copending load and store instructions, the system comprising:
- an external memory device;
- a processor for issuing memory access instructions including cacheable load and store instructions, wherein the load and store instructions specify addresses;
- a cache having a plurality of cache lines for storing data;
- a bus controller having a bus queue for storing pending load instructions;
- comparator logic circuitry for comparing the address specified by a store instruction with all the addresses specified by the pending load instructions in the queue, wherein the comparator issues a stall signal to stall instruction issue and execution of the store instruction if the store instruction address matches any of the addresses specified by the pending load instructions.

28. The system of claim 27, wherein a load instruction is stored in the queue if the load instruction misses the cache, and a load instruction is flushed from the queue if data from the address specified by the missed load instruction returns.

29. The system of claim 28, wherein instruction issue and execution of the store instruction are unstalled when the load instruction specifying the matching address is flushed from the queue.

30. The system of claim 27, wherein each address is a predetermined portion of a full address.

31. The system of claim 27, wherein each address is a line address.

32. The system of claim 27, wherein each address is an address tag.

33. A computer system for maintaining cache coherency for copending load and store instructions, the system comprising:
- an external memory device;
- a processor for issuing memory access instructions including cacheable load and store instructions, wherein the load and store instructions specify addresses;
- a cache having a plurality of cache lines for storing data;
- a bus controller having a bus queue for storing pending load instructions;
- a pending array having a plurality of array entries, each entry maintaining a count of the number of load instructions pending in the bus queue for each address specified by a pending load instruction;
- detection circuitry for stalling instruction issue and execution of a store instruction upon detecting that the count for the cache line corresponding to an address specified by the store instruction is not zero.

34. The system of claim 33, further comprising a counter for incrementing the count for the address specified by a load instruction that misses the cache, and for decrementing the count for the address specified by a missed load instruction if data from the address specified by the missed load instruction returns.

35. The system of claim 34, wherein the detection circuitry unstalls instruction issue and execution of the store instruction upon detecting that the count for the address specified by the stalled store instruction is zero.

36. The system of claim 33, wherein a load instruction is stored in the queue if the load instruction misses the cache, and a load instruction is flushed from the queue if data from the address specified by the missed load instruction returns.

37. The system of claim 33, wherein each address is a predetermined portion of a full address.

38. The system of claim 33, wherein each address is a line address.

39. The system of claim 33, wherein each address is an address tag.

* * * * *